No. 883,721. PATENTED APR. 7, 1908.
F. D. KENDALL & T. O. ROBINSON.
FRUIT AND VEGETABLE DRIER.
APPLICATION FILED SEPT. 16, 1907.
2 SHEETS—SHEET 1.
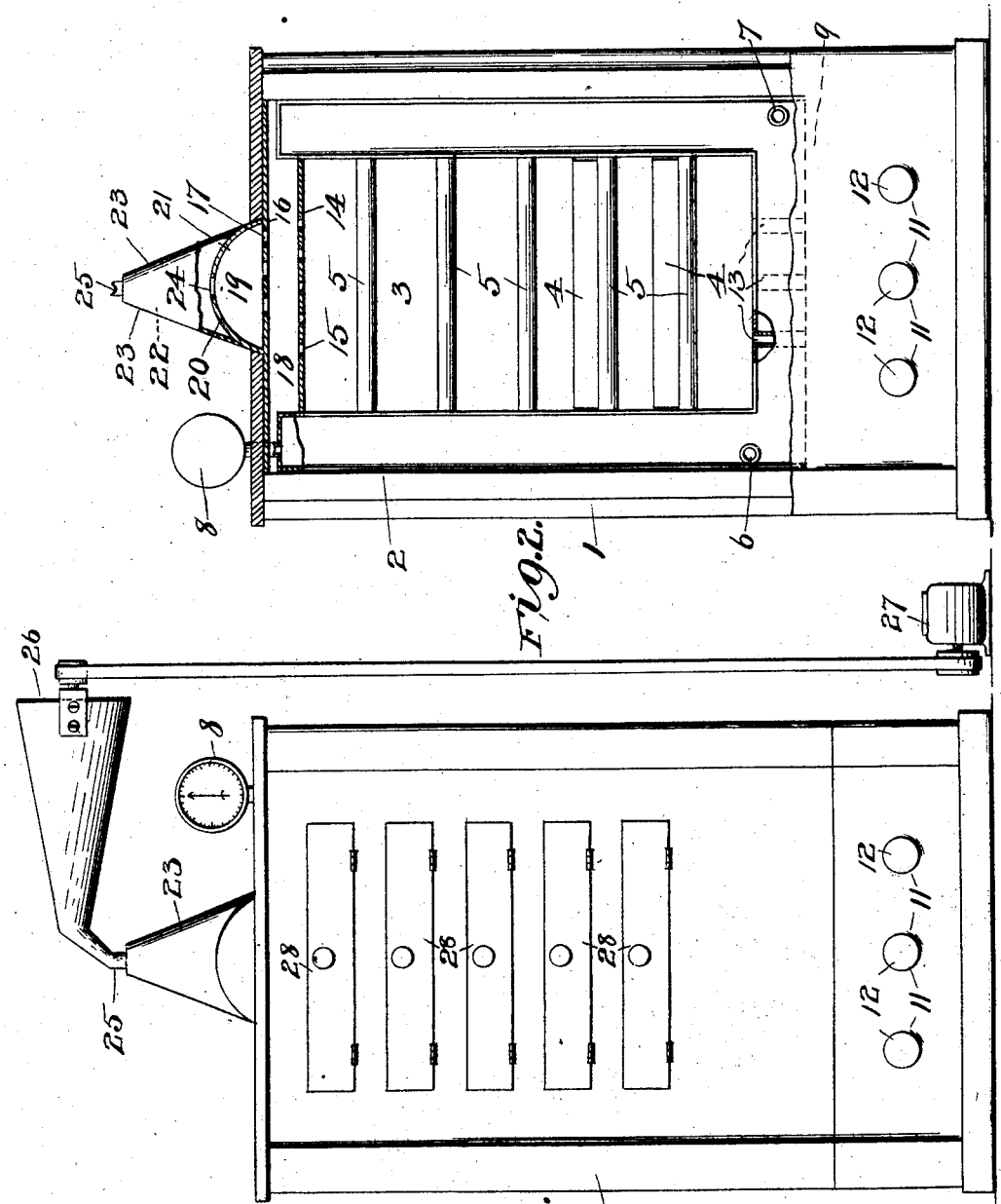

No. 883,721. PATENTED APR. 7, 1908.
F. D. KENDALL & T. O. ROBINSON.
FRUIT AND VEGETABLE DRIER.
APPLICATION FILED SEPT. 16, 1907.
2 SHEETS—SHEET 2.
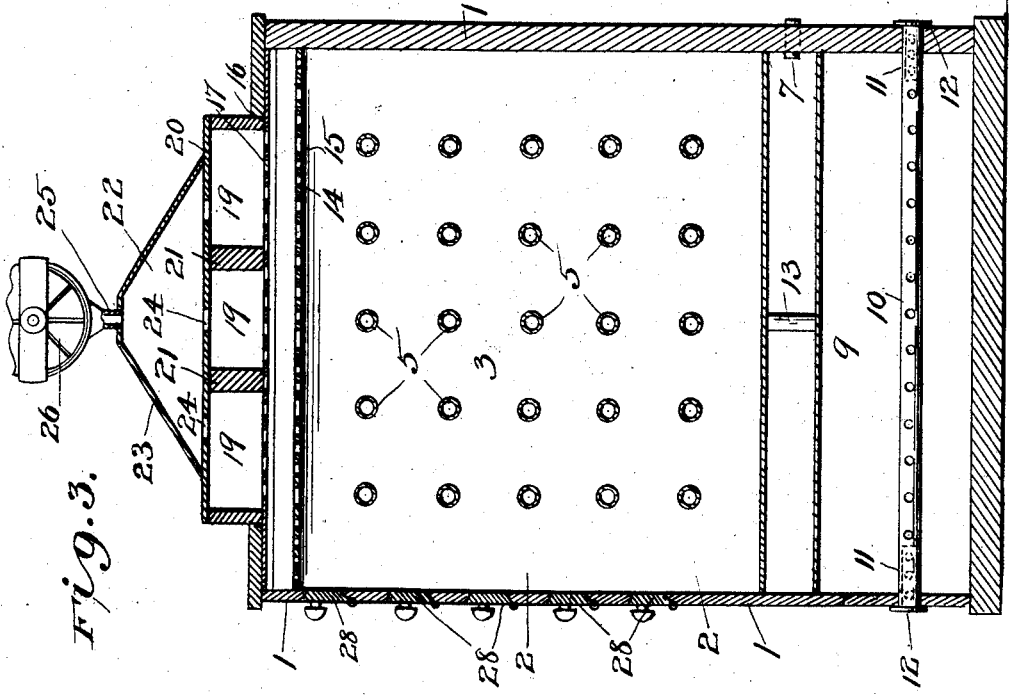
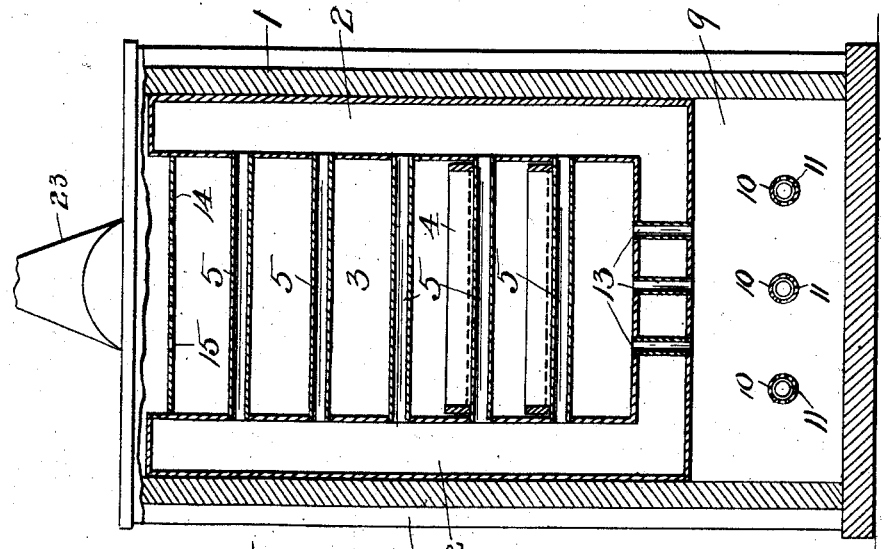
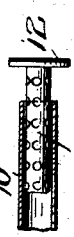

UNITED STATES PATENT OFFICE.

FRANK D. KENDALL AND THOMAS O. ROBINSON, OF HANFORD, CALIFORNIA.

FRUIT AND VEGETABLE DRIER.

No. 883,721.           Specification of Letters Patent.          Patented April 7, 1908.

Application filed September 16, 1907. Serial No. 393,059.

*To all whom it may concern:*

Be it known that we, FRANK D. KENDALL and THOMAS O. ROBINSON, citizens of the United States, residing at Hanford, in the county of Kings and State of California, have invented certain new and useful Improvements in Fruit and Vegetable Driers, of which the following is a specification.

Our invention relates to devices for drying fruits, vegetables, etc., and has for its object the provision of a drying apparatus comprising a casing having a steam chamber therein consisting of a substantially U-shaped tank having rows of tubes connecting its two upright portions that are used for racks for the drying trays. The lower portion of the steam chamber has air tubes passing through it to carry air from the air chamber in the lower portion of the casing to the drying chamber. Provision is made for controlling the amount of air admitted to the air chamber and an exhaust fan provided in the air outlet to maintain a circulation of air in the drying chamber and to carry off the moisture released by the heated air.

The construction and advantages of our invention will be fully described hereinafter and illustrated in the accompanying drawings in which—

Figure 1 is a front view of our improved drying apparatus, Fig. 2, a rear view partly in section, Fig. 3, a central longitudinal sectional view, Fig. 4, a cross section, and Fig. 5, a detail view of one of the air-inlet tubes.

In the drawings similar reference characters indicate corresponding parts throughout the several views.

The casing 1 of our improved drying apparatus has a steam chamber 2 therein that is substantially U-shaped, the two upright portions inclosing the sides of the drying chamber 3 with the racks for the drying trays 4 consisting of pipes 5 connecting the two upright portions of the chamber 2 to permit circulation of steam therethrough. 6 indicates the steam inlet, 7 the exhaust and 8 a pressure gage to determine the condition of the steam in chamber 2.

Below the steam chamber 2 is an air-space 9 with perforated pipes 10 running therethrough. The ends of pipes 10 extend outside of casing 1 and have perforated thimbles 11 slidably mounted in their ends with projecting flanges 12 that can be adjusted to regulate the amount of air entering the pipes 10 and air space 9.

13 indicates tubes secured in the lower portion of steam chamber 2 to convey the air from air-space 9 to the drying chamber 3, it being understood that the air becomes partially heated in the air space and in tubes 13 before entering the drying chamber 3 and after entering the drying chamber the temperature is increased by the heat created by the steam in pipes 5 so as to enable the air to take up the moisture from the fruit or vegetables on the trays 4.

14 indicates a plate secured near the upper ends of the upright portions of steam chamber 2 across the top of drying chamber 3 and having a plurality of rows of perforations 15 therein.

Secured above the top of the upright portions of steam chamber 2 is another plate 16 having perforations 17 therein that are larger than the perforations 15 in the plate 14 and not in line therewith, an exhaust chamber 18 being formed between said plates 14 and 16. Above plate 16 is a series of semi-cylindrical compartments 19 formed by semi-cylindrical plate 20 and semi-circular ends and partitions 21, said compartments inclosing the perforations 17, and above compartments 19 is another compartment 22 having converging sides 23, the compartments 19 being in communication with compartment 22 through perforations 24.

25 indicates the exhaust duct secured in the upper end of compartment 22 and consisting of a pipe having divergent sides as shown and provided with an exhaust fan 26 in its outer end that may be driven by any suitable motor 27. By this construction it will be understood that the draft created by the fan 26 is evenly distributed throughout the compartments 22 and 19 and exhaust chamber 18 so that a practically even temperature is maintained throughout the drying chamber 2 and the exhaust of moisture-laden air is about equal throughout said chamber, so that the fruits or other products are evenly dried and the most satisfactory results thereby secured.

28 indicates doors in the front of the casing for placing and removing the trays 4 on the rack-pipes 5.

Having thus described our invention what we claim is—

1. In a drying apparatus, the combination of an air chamber, air inlet tubes connecting the opposite walls of said air chamber having their ends opening outside of the walls and the portion of the pipe inside of the chamber perforated, and perforated thimbles slidably mounted in the ends of the tubes to control the ingress of air to said tubes and chamber.

2. In a drying apparatus, a casing, a U-shaped steam chamber having upright portions extending up the two sides of said casing, pipes connecting the upright portions to hold the steam and form racks for the drying trays, an air chamber below said steam chamber, and pipes running through the lower part of the steam chamber to admit air to the drying trays, substantially as shown and described.

3. In a drying apparatus, a casing, a U-shaped steam chamber contained in said casing, the upright portions of said steam chamber extending up the sides of the casing, the space between said upright portions forming the drying chamber, pipes connecting said upright portions across said drying chamber to hold steam and form racks for the drying trays, air pipes running through the lower portion of the steam chamber, an air chamber in the lower portion of the casing and in communication with the air pipes aforesaid, and means to exhaust the air from the drying chamber, substantially as shown and described.

4. In a drying apparatus, the air exhaust comprising an exhaust chamber having perforated walls for the admission and discharge of air, a series of compartments in communication with said exhaust chamber, a single compartment in communication with said series of compartments, and an exhaust duct in communication with the last-mentioned compartment and having an exhaust fan therein, substantially as shown and described.

5. A drying apparatus comprising a casing, a U-shaped steam chamber in said casing, an air-chamber beneath said steam chamber, air-inlets comprising perforated tubes extending through said air-chamber and having their ends extending outside of the casing, perforated thimbles loosely mounted in said perforated tubes, air-pipes extending through the lower portion of said steam-chamber and connecting the air-chamber and drying chamber, and means to exhaust the air from the drying chamber, substantially as shown and described.

6. A drying apparatus comprising a casing, a U-shaped steam chamber in said casing, an air-chamber beneath said steam chamber, air-inlets comprising perforated tubes extending through said air-chamber and having their ends extending outside of the casing, perforated thimbles loosely mounted in said perforated tubes, air-pipes extending through the lower portion of said steam-chamber and connecting the air-chamber and drying chamber, perforated plates secured above said drying chamber and spaced apart to form an exhaust chamber, a series of compartments in communication with said exhaust chamber, a single compartment in communication with said series of compartments, and an exhaust duct in communication with the last-mentioned compartment and having an exhaust fan therein, substantially as shown and described.

In testimony whereof we hereto affix our signatures in the presence of two witnesses.

FRANK D. KENDALL.
THOMAS O. ROBINSON.

Witnesses:
E. T. CASPER,
C. T. ROSSON.